INVENTOR.
EDMUND WESOLOWSKI
BY Edward H. Lang
ATTORNEY

UNITED STATES PATENT OFFICE 2,946,891
Patented July 26, 1960

2,946,891

TEST APPARATUS AND METHOD

Edmund Wesolowski, Cary, Ill., assignor to The Pure Oil Company, Chicago, Ill., a corporation of Ohio Filed July 30, 1956, Ser. No. 601,071

8 Claims. (Cl. 250—83.6)

This invention relates to the determination and measurement of foreign accumulations within confined spaces. It is more specifically concerned with the application of radioactive tracers for investigating the deposit-forming tendencies of fluid systems flowing within enclosed volumes.

A common method of determining the presence of a specific compound or element in the product(s) of a chemical reaction is the so-called radioactive "tagging" of a portion of the reactant atoms. For example, molecules containing one or more atoms of radioactive carbon can be included in known amounts with similar, non-radioactive molecules in a reactant, after which the mechanics of a chemical reaction involving this reactant can be studied by separation of the reaction products and subsequent determination of the relative proportions of radioactive carbon in each of these products by means of radiation measurements. It is also possible to determine the amount of sedimentation or deposition from fluid stream components by similar techniques, but shape, size, and/or inaccessibility of the interiors of conduits and vessels in which these fluids are contained frequently make radiation measurements by common methods difficult or impossible. For example, in the determination of the tendencies of fuels, lubricants, coolants, metals, etc., to form deposits on the cylinder and combustion chamber walls of internal combustion engines, these various materials may each be tagged in turn, and the extent of their contribution to deposit formation may be subsequently determined by measurement of the radioactivity of the deposits formed during a given period of engine operation. Heretofore, these measurements of radioactivity have been possible only after the cylinder heads had been removed so that a conventional detecting device could be inserted into the cylinder and combustion chamber; or, autoradiography techniques employing X-ray film could be employed. In some cases it has been necessary to scrape the deposit from the walls in order that radioactivity measurements could be more conveniently determined outside of the chamber, a practice which has prevented determination of whether the deposits continued to accumulate or were removed from the walls and exhausted from the chamber during later engine operation.

It is therefore a primary object of this invention to provide a method for making non-destructive studies of the deposit-forming tendencies of fluids in contact with the interior surfaces of enclosed spaces by radioactive identification, without requiring large-size access openings into the enclosed space.

Another object of this invention is to qualitatively and quantitatively measure by their radioactivity residues from fuels and lubricating oils which form in the combustion chamber of automotive and aircraft engines.

An additional object of this invention is the convenient measurement of radioactive deposits of low intensity formed within confined spaces.

Figures 1, 2:
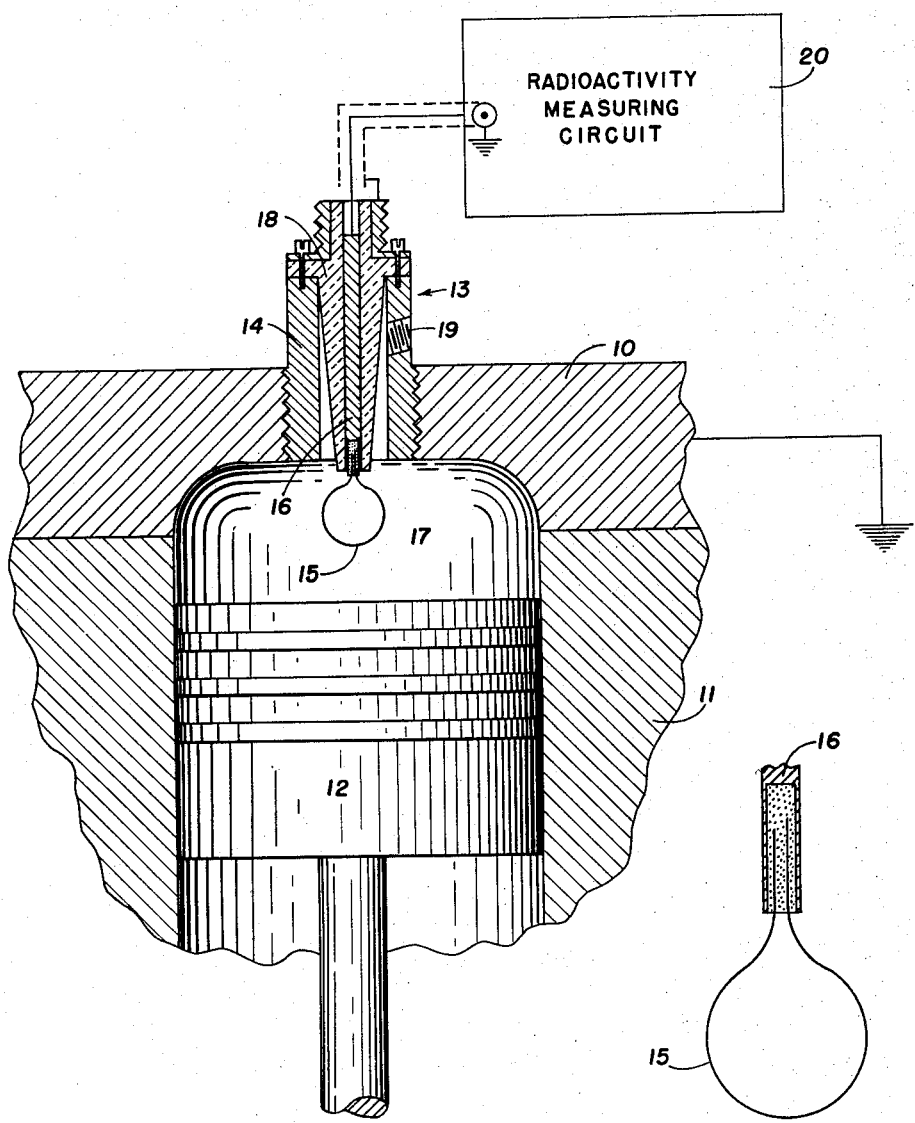
Figure 1 is a cross-sectional view showing the application of this invention to the study of deposits formed within the combustion chamber of a spark-ignited, internal combustion engine.
Figure 2 is a fragmentary view of a preferred anode construction.

In accordance with this invention, a fluid constituent suspected of having deposit-forming tendencies is "tagged" by means of a suitable radioactive component, such as $C^{14}$, and is passed through, or confined or burned in, the vessel or conduit in normal fashion for a short period of time. At the end of this operating period, operation is stopped and the confined space is purged by any suitable means, such as purging with inert gas. A wire electrode, which serves as the anode member of the radioactivity detector, is then inserted into the vessel or conduit through the small opening which has been provided. For example, when making radioactivity measurements within an engine combustion chamber, the spark-plug hole is ideally suited for this purpose. In the process of this invention, the vessel walls which enclose the space function as the cathode to form, in combination with the inserted anode, a radioactivity detector when a suitable counter gas is introduced into the enclosed space. The vessel and inserted anode are electrically connected to a conventional scaler or rate-meter which supplies a suitable D.C. high voltage for operation of the detector and whereby the radioactivity can be registered. When the radioactivity measurement has been completed, the detector anode is removed from its position, the access hole is closed, and normal operation of the process equipment may be resumed. Accordingly, the use of the process of this invention permits the measurement of radioactivity within the confined space without disturbing the geometry or deposits within the space.

Although this invention can be employed in investigating the deposit-forming tendencies of fluid systems such as steam engines, heat exchangers, pumps, small pilot plants, or other systems containing fluid-tight, enclosed chambers within which deposits from the fluids may be formed, it is especially adaptable to the study of deposits which form in combustion chambers of automotive and aircraft engines. Accordingly, the specific embodiment which is illustrated in the attached drawing shows this application of the invention. While my method and apparatus may be adapted to any closed system by providing a suitable aperture through which the anode may be inserted, it is seen that a spark-plug opening is especially well-suited to this purpose. With reference to the accompanying drawing, there is seen a fragmentary view of an internal combustion engine. Cylinder head 10, block 11, of which only a partial section is shown, and the upper face of piston 12 define the limits of a confined space into which adapter 13 is inserted. The adapter-connector consists of external housing 14 which is preferably made of metal and threaded at one end to mate with the threaded spark-plug hole, and fitted at the other end to permit the electrical coupling of the apparatus with conventional detecting and measuring network 20. This electrical connection can be made by employing conventional electrical connectors designed for use with coaxial cables, similar to Amphenol RG-/U cable or the like, e.g. Amphenol low-loss RF plug type connectors, etc. Housing 14 can be of any electrically conducting material, with brass being preferred, or of any insulating material, such as Teflon or nylon. If an insulating material is used, a separate electrical connection must be made directly from the metallic wall confining the enclosed space under scrutiny to the detecting and measuring circuit.

Inside housing 14, and positioned along its longitudinal axis, is anode 16, which is preferably made of tungsten or stainless steel, although other electrically conducting materials may be used. An anode wire having a diameter of 3–4 mils is especially well-suited to this purpose. Anode 16 terminates inside chamber 17 in a circular loop, ring, or bead, which is provided to avoid points of concentrated flux in operation. Anode 16 is electrically insulated from housing 14 (if a metallic housing is employed) by insulation 18, which extends along anode 16 to a point beyond the end of housing 14. Counter-gas inlet 19 is provided in housing 14 for the introduction of counter gas during radiation measurements. The counter gas is essential to provide an ionizing atmosphere within chamber 17.

It is emphasized that when my method and apparatus are used, housing 14, cylinder head 10, block 11 and piston 12 all cooperate to constitute the cathode. Previous methods and devices for measuring radiation have required that a detecting instrument comprising a cathode and anode be provided, and have been unsatisfactory for radiation measurements inside of odd-shaped vessels, such as the combustion chamber of my example.

The counter is then electrically connected to auxiliary electronic circuit 20 which controls, and measures or records, the voltage pulse which is produced on the anode by the counter discharge. Because the details of such circuitry are outside the scope of this invention and may be obtained from standard works on counting radioactivity, they are not included herein. For example, see "Electron and Nuclear Counters," Korff, Van Nostrand, 2nd edition, 1955, chapter 7, and references cited therein; "Counting Tubes," Curran et al., Academic Press, 1949, chapter 8. These references discuss voltage power units, amplifiers, scalers, ratemeters, and other apparatus which can be used to translate the intensity of the radioactivity emanating from the deposits within the confined space being scrutinized into qualitative and/or quantitative data which permit an appropriate analysis of the system under investigation.

It is seen that this invention permits convenient qualitative and quantitative measurements of the radioactivity of deposits, or accumulations, within a confined space. One of the features of this invention is the use of an anode member which, when mounted in an appropriate adapter, can be disposed within the confined space, and which, in cooperation with the electrically conductive, space-enclosing vessel, forms a counting device which detects the passage of charged particles through the volume between the electrodes and manifests this passage in the form of electrical impulses. The application of this invention permits economical tracer studies of fluid-flow systems in which a variety of fluids are flowing. Because isotopes with suitable half-lives and radiation characteristics are known for many of the common elements, a practically unlimited number of substances whose deposit-forming tendencies are to be studied can be made radioactive or "tagged" by the incorporation of one of these radioactive elements. Although various types of energetic radiation are emitted by radioactive materials, only those radioactive atoms which emit beta and/or gamma radiation are commonly used in tracer work because many counter devices require that the energetic radiation pass through a material of construction embodied in the counter before it can be detected. These types of counters thereby preclude the use of radioactive isotopes which emit alpha particles because these particles have too little penetrating power. According to the instant invention, however, even tracer materials which emit alpha particles can be employed in studies of identification by radioactivity because this invention does not require that the radiations pass through the walls of the counter prior to being detected. The range of materials that can be studied is therefore greatly enlarged. It is preferred, however, that radioactive tracers which emit beta-particles be utilized in carrying out this invention. In the petroleum industry the more important beta-particle emitters are tritium, $H^3$, and carbon 14, $C^{14}$. Most of the counters previously available have had a very low efficiency for measuring beta radiation. Thin-walled counters have been devised, but even these have absorbed a very large proportion of the weaker beta-rays, such as those emitted by tritium, carbon-14, and sulfur-35, in their walls. In fact, most counters having shapes suitable for introduction into the spaces for which this invention is intended have had wall thicknesses such that 100% of this radiation has been absorbed. The radiation absorbed therefore has not been counted, and useful isotopes have been limited to those which emit stronger radiations. These radioactive elements can be chemically combined with a wide variety of fluids which are utilized in the petroleum industry. There is commercially available a wide variety of organic chemicals which can be used, per se, in radioactive tracer studies, or which can be employed to incorporate into a petroleum hydrocarbon molecule or derivative thereof a radioactive constituent. Among the carbon-14 labeled compounds which are commercially available are sodium carbonate; sodium cyanide; various acetylenes and ethylene derivatives, e.g., acetylene, ethylene, maleic anhydride, ethylene glycol; various alcohols and their derivatives, e.g., methanol, benzyl alcohol, acetone; ethylene iodide, acids and their derivatives, such as sodium acetate, ethyl cyanoacetate, succinic acid, urea, phthalic anhydride; ring compounds, e.g. benzoic acid, benzene, aniline; amines and their derivatives, such as, methylamine hydrochloride; and saturated hydrocarbons, such as n-octane and octadecenylmethane. Also available are deuterated compounds, as well as compositions containing iodine-131, phosphorus-32, sulfur-35, etc.

To study deposit formation within a confined space, another technique can be employed utilizing the process and apparatus of this invention. This alternate method evaluates deposit accumulation by measuring the radiation absorbed by a non-radioactive deposit. To carry out this facet of the invention, an interior metallic surface within the confined space can be coated with an alpha- or beta-particle emitter in accordance with the technique suggested in U.S. Patent 2,660,678. Any deposit accumulating on the radioactive surface will attenuate the radiation and reduce the counting rate. As an additional application, both the techniques of employing "tagged" radioactive tracers and radioactive plated surfaces can be combined. For example, if an alpha-particle emitter is used on the chamber surface and a beta-particle emitter as a tracer in the deposit-forming fluid, both effects can be measured by using the device for proportional counting and discrimination of alphas and betas by the methods commonly employed in the art.

In constructing the anode element which is disposed in the enclosed space wherein the deposition study is to be made, the electrode is mounted within a suitable adapter for installation in the vessel or chamber. It may be required that a small access hole be provided in the wall of the vessel, apparatus, or machine. This hole should be fitted with a suitable closure which is installed during the use of the machine or apparatus in the system in which it is installed. In the case of spark-ignited, internal combustion engines, the spark-plug hole in the cylinder head of the engine block can be used to mount the anode element within the combustion chamber when investigating combustion chamber deposit formation. Provisions also must be made for introducing the counter gas into the enclosed space to permit the space to function as a counting chamber. This can be accomplished by means of a separate inlet in the wall of the vessel, apparatus, or machine, leading into the enclosed space. Preferably, the counter-gas inlet is in the anode holder as shown in the accompanying drawing. Any suitable counter gas can be used, such as helium, argon, hydrogen, neon, nitrogen, oxygen, gaseous hydrocarbons, etc. Although air can be employed in some cases, attendant disadvantages usually make its use impractical. The counter gas is introduced at a pressure slightly greater than atmospheric. After thorough flushing of the enclosed space, the flow of counter gas may be reduced to as low as about 0.1 cc. per minute, but higher flows insure against contamination by air, or by vapors from the deposits. A pressure in the counting chamber higher than atmospheric is preferred in order to provide an ionization current of greater intensity. Because the enclosed space forms the counting chamber and the walls of the space function as the cathode, an electrical connection for connecting the cathode member of the counter in the counting circuit is provided. This can be any suitable connector means electrically affixed to a convenient location on a wall of the enclosed space or it may be an integral part of the adapter of this invention as employed in the adapter unit hereinbefore described.

The anode or collecting electrode is preferably fabricated of wire, using features of prior art construction. Preferably, the wire diameter should be as small as possible, in order to secure low voltages. Generally, 3–4 mil tungsten wire is employed; however, this is not limiting as other diameters and materials of construction can be used depending upon the exigencies of those employing the teachings of this invention. In general, smaller diameter wires yield greater amplification factors, i.e., larger pulses are produced by each ionizing event. Also, lower potentials are required when smaller wires are used. The terminal extremity of the anode disposed within the confined space can take any convenient form designed to avoid points of concentrated flux in operation. For example, it may be in the form of a small round bead having a diameter of about 1.5 mm., a ring, a loop, etc. Although the entire anode can be fabricated from wire, it may be desired, from structural considerations, to utilize an electrically conductive rod to which is affixed the small diameter anode wire by means of a clamping device, welding, or other expedient. In general, where the device is to be used as a proportional counter, the anode terminates in a wire loop having a diameter of $\frac{3}{8}$–$\frac{1}{2}$ inch, such as shown in Figure 2 or as described in U.S. Patent 2,505,919. To permit flexibility in use, the anode or collecting electrode may be slidably mounted in its holder. However, it is more advantageous to have a plurality of adapters with anodes of different length, because the thin wires are susceptible to injury if slidably mounted. The length of the anode must be accurately reproducible for quantitative measurements. The length of the electrode will vary depending upon the service in which it is to be used. This is best determined by the geometry of the enclosed space wherein the deposit formation is being studied. Generally, the electrode extends to about the center of the enclosed space.

While in most installations the anode, or collecting electrode, is centrally or coaxially mounted in the confined space for maximum accuracy, in some instances this type of mounting may not be essential in carrying out the invention. In such cases, it is only necessary that a spaced non-electrically-conductive relationship between the walls of the confined space (cathode) and the collecting electrode be provided. A chamber of irregular shape and off-axis positioning of the anode wire will produce noticeable effects in the plateau characteristics of the counter. According to Korff, off-center (but axis-parallel) positioning of the center wire will lower the operating voltage, but operation is satisfactory up to a position about 2 mm. from the wall of a 6 cm. diameter cylinder. Irregularly shaped counting volume and off-axis anode alignment produce non-flat plateaus because of field non-uniformity, i.e., variations in pulse height formation. Likewise, the geometry of the ionizing chamber can vary in cross-section and can be circular, rectangular, elliptical, triangular irregular, or otherwise shaped without inimically affecting the process of this invention.

A leak-free ionizing chamber is not required since a positive gas flow is maintained. As in the case of the combustion chamber, scavenging of the space with counter gas would be improved somewhat by the flow of gas past the piston. However, measurements are made when the piston is so located that the valves are closed in order to avoid using unusually large volumes of gas. Leak-free construction is required only when the counter is to be permanently filled.

The magnitude of the potential difference applied across the walls of the enclosed space, which function as the cathode, and the anode or collecting member will vary depending upon the ease of detecting, measuring, and counting the ionizing event, such as the passage of an energetic radiation through the ionization chamber. This voltage should be sufficiently high to permit an increased ionization for an incremental change in intensity of the ionizing event, but low enough to avoid ionization of the counter-gas molecules and the resultant "gas-discharge" effect. Generally, a D.C. potential difference of 1000 to 2500 volts is satisfactory. This voltage can be supplied by conventional, high voltage, power units such as those described by Curran, et al. in "Counting Tubes," cited supra, at page 123, et seq.

To illustrate a preferred mode for carrying out this invention in the study of deposit formation in the combustion chamber of a spark-ignited, internal combustion engine, a gasoline additive containing radioactive lead was made using lead-210 chloride, in non-radioactive lead chloride, at a concentration of 1 millicurie per 100 grams, to synthesize tetraethyllead in a Grignard-type reaction with ethyl chloride according to the teachings of the prior art (vide: Industrial and Engineering Chemistry, 45 (8), 1745, August 1953, for details of preparation). Lead-210 is a beta-particle emitter with a half-life of 22 years, and is one of the decomposition products of the uranium series. Three ml. per gallon of this tetraethyl (radio) lead additive was put into a motor fuel consisting of a commercial gasoline base stock (catalytically cracked or straight-run, and containing less than 0.05% sulfur) of a quality sufficient to insure knock-free operation. This fuel was used in the operation of a C.O.T. engine operated at 1400 r.p.m., 150° F. oil-sump temperature, 800° F. exhaust temperature, and 175° F. cooling-jacket temperature.

After four hours of operation the engine was shut down. The spark plug was removed and replaced with an anode or collecting electrode mounted in an adapter as hereinbefore described. The anode was a 3 mil tungsten wire terminating in a loop $\frac{3}{8}$ inch in diameter. The combustion chamber was purged with nitrogen and a counter gas consisting of a mixture of 90 volume percent argon and 10 volume percent methane was introduced until the pressure of the ionizing chamber was about 200 p.s.i.g. A potential of 1400 volts was impressed between the walls of the combustion chamber (cathode) and the anode. The counter was connected to a conventional scaler, or ratemeter, through a pulse amplifier, and the radioactive deposits were found to have an intensity of 1000 counts/minute. Substances in the system other than the radioactive components also contribute to the deposit formed. Consequently, since the data obtained are indicative of only the radioactive material, estimations of the absolute amount of deposit are based on the amount of lead in the deposit, as indicated by the activity detected, and on knowledge of the composition of the deposit. To make quantitative determinations, the net efficiency and background characteristics of the counter must be known. Background data is obtained by counting the radioactivity of the deposit-free chamber. Since background radioactivity is essentially independent of the amount of deposit, the initial data is applicable to subsequent measurements.

Counter efficiency is obtained by measuring the counting rate of a source of known activity (disintegration rate). If a point source is used, the chamber may be checked for variations of detection efficiency in various parts of the chamber.

Accordingly, it is seen that this invention permits the quantitative and qualitative measurement, by radiochemical identification, of accumulations or deposits laid down in enclosed spaces by deposit-forming fluids. The qualitative aspects of this invention are accomplished by separately tagging with a radioactive chemical the various constituents of the fluids suspected of deposit-forming tendencies and detecting the presence of radioactivity employing the process of this invention.

In conducting tests using this invention, safety precautions should be taken for the protection of operating personnel where high levels of radiation are encountered. One of the advantages of this invention, however, is its use in the measurement of radioactivity of very low intensities because it is not necessary for the energetic radiation to penetrate the walls of a counting chamber in order to induce ionization of the counter gas. This is avoided by using the enclosed space as the ionizing chamber and the enclosing walls as the cathode element.

Accordingly, I claim as my invention:

1. A method for measuring the extent of accumulation of foreign deposits within an enclosed space contacted by fluids having deposit-forming tendencies which comprises forming within said space an accumulation of a foreign deposit having incorporated therein a radioactive material, capable of emitting detectable radioactivity, disposing within said space a first electrode in non-electrical contact with the walls of said space, the walls of said space comprising a second electrode, filling said space with a counter gas, applying a high voltage, direct current, potential difference between the walls of said enclosed space and said first electrode to positively charge said electrode and effect the accumulation of electrified particles thereon and measuring the level of the radioactive radiation emanating from said deposits.

2. A method for quantitatively and qualitatively measuring the accumulation of deposits laid down within an enclosed space by a fluid having deposit-forming tendencies flowing within said space in contact with the walls thereof which comprises incorporating in said fluid a radioactive element to produce a "tagged" fluid, passing said "tagged" fluid through a space enclosed by metallic walls whereby deposits resulting from said fluid accumulate on the walls of said space, flushing said fluid from said space, filling said space with a counter gas, disposing in said space an electrode in spaced relationship with said walls and electrically insulated therefrom impressing across said walls and said electrode a high voltage, direct current potential of sufficient intensity, in combination with the radioactive emanations from said deposits, to induce the ionization of said counter gas, and measuring the radioactivity within said confined space.

3. A method for investigating deposit formation within the combustion chambers of internal combustion engines which comprises chemically incorporating in not more than one fluid coming in contact with the walls of said combustion chamber a radioactive element to produce a "tagged" fluid, operating said engine in the presence of said fluid for a time sufficient to determine the deposit-forming tendencies of said fluid, flushing said combustion chamber, filling said chamber with a counter gas, disposing in said chamber an electrode in spaced relationship with said walls and electrically insulated therefrom, impressing across said walls and said electrode a high voltage, direct current potential of sufficient intensity, in combination with the radioactive emanations from any deposits formed within said chamber by said fluid, to induce the ionization of said counter gas, and measuring the radioactivity within said confined space.

4. A method for investigating deposit formation within the combustion chamber of an internal combustion engine, said engine having an opening into said chamber and a spark plug installed therein, which comprises incorporating in not more than one fluid coming in contact with the walls of said combustion chamber a radioactive element to produce a "tagged" fluid, operating said engine in the presence of said fluid for a time sufficient to determine the deposit-forming tendencies of said fluid, removing said spark plug, substituting for said spark plug, an electrode in spaced relationship with said walls and electrically insulated therefrom, flushing said combustion chamber, filling said chamber with a counter gas, impressing across said walls and said electrode a high voltage, direct current potential of sufficient intensity, in combination with the radioactive emanations from any deposits formed within said chamber by said fluid, to induce the ionization of said counter gas, and measuring the radioactivity within said confined space.

5. A method in accordance with claim 4 in which said radioactive element emits energetic radiations selected from the group consisting of alpha-particles and beta-particles.

6. A method in accordance with claim 5 in which said radioactive element is selected from the group consisting of $C^{14}$, $H^3$, $I^{131}$, $P^{32}$ and $S^{35}$.

7. A method for measuring the extent of accumulation of foreign deposits within an enclosed space contacted by fluids having deposit-forming tendencies which comprises forming within said space an accumulation of a foreign deposit having the property of influencing radioactivity emanating within said space, disposing within said space a first electrode in non-electrical contact with the walls of said space, the walls of said space comprising a second electrode, filling said space with a counter gas, applying a high voltage, direct current, potential difference between the walls of said enclosed space and said first electrode to positively charge said electrode and effect the accumulation of electrified particles thereon and measuring the level of the radioactive radiation of said space.

8. A method for measuring the extent of accumulation of foreign deposits within an enclosed space contacted by fluids having deposit-forming tendencies which comprises providing within said space a surface having disposed thereon a radioactive coating and an accumulation of a foreign deposit having the property of influencing radioactivity emanating from said surface, disposing within said space a first electrode in non-electrical contact with the walls of said space, the walls of said space comprising a second electrode, filling said space with a counter gas, applying a high voltage, direct current, potential difference between the walls of said enclosed space and said first electrode to positively charge said electrode and effect the accumulation of electrified particles thereon and measuring the level of the radioactive radiation of said space.

References Cited in the file of this patent

UNITED STATES PATENTS

| | | |
|---|---|---|
| 1,095,244 | Tate | May 5, 1914 |
| 1,281,441 | Voigt | Oct. 15, 1918 |
| 1,991,780 | Bernstrom | Feb. 19, 1935 |
| 2,505,919 | Simpson | May 2, 1950 |
| 2,596,080 | Raper et al. | May 6, 1952 |

OTHER REFERENCES

"A Methane Flow Beta-Proportional Counter," by Bernstein et al., from Review of Scientific Instruments. vol. 20, No. 5; pages 347 to 349, May 1949.